(12) United States Patent
van Ooij et al.

(10) Patent No.: US 7,994,249 B2
(45) Date of Patent: Aug. 9, 2011

(54) SILANE COATING COMPOSITIONS AND METHODS OF USE THEREOF

(75) Inventors: William J. van Ooij, Fairfield, OH (US); Karthik Suryanarayanan, Cincinnati, OH (US); Jaspreet Singh Gandhi, North Olmsted, OH (US); Naveen B V Simhadri, McLean, VA (US); Chetan Shivane, Hillsboro, OR (US); Matthew B. Stacy, Grove City, OH (US); Danqing Zhu, Mason, OH (US)

(73) Assignees: The University Of Cincinnati, Cincinnati, OH (US); ECOSIL Technologies LLC, Cincinnati, OH (US)

( * ) Notice: Subject to any disclaimer, the term of this patent is extended or adjusted under 35 U.S.C. 154(b) by 1053 days.

(21) Appl. No.: 11/366,284

(22) Filed: Mar. 2, 2006

(65) Prior Publication Data

US 2007/0056469 A1    Mar. 15, 2007

Related U.S. Application Data

(60) Provisional application No. 60/715,422, filed on Sep. 9, 2005, provisional application No. 60/715,445, filed on Sep. 9, 2005.

(51) Int. Cl.
*C08K 5/544* (2006.01)
*C08K 5/548* (2006.01)

(52) U.S. Cl. ...................................................... 524/188

(58) Field of Classification Search .................... 524/188
See application file for complete search history.

(56) References Cited

U.S. PATENT DOCUMENTS

| | | |
|---|---|---|
| 5,108,793 A | 4/1992 | van Ooij et al. |
| 5,200,275 A | 4/1993 | van Ooij et al. |
| 5,204,219 A | 4/1993 | van Ooij et al. |
| 5,292,549 A | 3/1994 | van Ooij et al. |
| 5,322,713 A | 6/1994 | van Ooij et al. |
| 5,326,594 A | 7/1994 | Sabata et al. |
| 5,433,976 A | 7/1995 | van Ooij et al. |
| 5,455,080 A | 10/1995 | van Ooij |
| 5,478,655 A | 12/1995 | Sabata et al. |
| 5,498,481 A | 3/1996 | van Ooij |
| 5,532,314 A | 7/1996 | Sexsmith |
| 5,539,031 A | 7/1996 | van Ooij |
| 5,750,197 A | 5/1998 | van Ooij et al. |
| 5,759,629 A | 6/1998 | van Ooij et al. |
| 5,958,161 A | 9/1999 | Grimberg et al. |
| 6,261,638 B1 | 7/2001 | van Ooij et al. |
| 6,268,421 B1 | 7/2001 | Dittrich et al. |
| 6,409,874 B1 | 6/2002 | Van Der Aar et al. |
| 6,416,869 B1 | 7/2002 | van Ooij et al. |
| 6,475,300 B2 | 11/2002 | Shimakura et al. |
| 6,560,079 B1 | 5/2003 | Hirsh et al. |
| 6,756,079 B2 | 6/2004 | van Ooij et al. |
| 6,827,981 B2 | 12/2004 | van Ooij et al. |
| 6,919,469 B2 | 7/2005 | van Ooij et al. |
| 6,955,728 B1 | 10/2005 | van Ooij et al. |
| 2004/0062873 A1 | 4/2004 | Jung et al. |
| 2005/0058843 A1 | 3/2005 | van Ooij et al. |
| 2005/0079364 A1 | 4/2005 | van Ooij et al. |
| 2005/0179011 A1 | 8/2005 | van Ooij et al. |

FOREIGN PATENT DOCUMENTS

| | | |
|---|---|---|
| DE | 10015308 | 10/2001 |
| DE | 10330237 | 9/2004 |
| EP | 816420 | 1/1998 |
| EP | 1130131 A2 | 5/2001 |
| WO | 00/38844 A1 | 7/2000 |
| WO | 00/39356 A1 | 7/2000 |
| WO | 2004009717 | 1/2004 |
| WO | WO2004009717 | 1/2004 |
| WO | 2005/035634 A2 | 4/2005 |

OTHER PUBLICATIONS

Ashirgade et al, "Novel, One-step, Chromate-free . . . ", Strategic Environmental Research and Development Program (2007).*
Jang et al., Corrosion Protection of Epoxy-Coated Steel Using Different Silane Coupling Agents, Journal of Applied Polymer Science, vol. 71, 585-593 (1999).
Jayaseelan et al.,Rubber-To-Metal Bonding by Silanes, pp. 1-14, Proceedings of Rubber Bonding 2000 Conference, May 15-16, 2000.
Van Ooij et al., Bonding Metals to Rubber Using functional and Nonfunctional Silanes, 6 pp., Extended abstract of paper presented at Adhesion 99', Cambridge, UK, Sep. 15-17, 1999.
Van Ooij et al., Bonding rubber to Metals by Organofunctional and Non-Functional Silanes, 3 pp., Extended Abstract of Paper Presented at Euradh '98—4th European Conference on Adhesion, WCARP-1—1st World Congress on Adhesion and Related Phenomena, Garmisch-Partenkirchen, Germany, Sep. 6-11, 1998.
Van Ooij, Rubber-Brass Bonding, pp. 1-22 and 8 sheets of Figures, Chapter in Rubber Handbook RAPRA Technology, 1999. Van Ooij et al., Silane Based Chromate Replacements for Corrosion Control, Paint Adhesion, and Rubber Bonding, pp. 386-396, Surface Engineering, vol. 6, No. 5, 2000.
Van Ooij et al., The Use of Organofunctional Silanes for Bonding Rubber to Metals, pp. 1-6, Paper to be presented at RubTech Expo 2002, New Delhi, India, Nov. 28-30, 2002.
International Search Report received in PCT/US2006/034705, mailed Apr. 26, 2007, 5 pages.
PCT Search Report and Written Opinion for application PCT/US2006/034049 mailed Dec. 2, 2008.

* cited by examiner

*Primary Examiner* — David M Brunsman
(74) *Attorney, Agent, or Firm* — Wood, Herron & Evans, LLP (57) ABSTRACT

A method of treating a substrate, such as a metal surface, by application of a silane coating composition containing at least one water-soluble or dispersible silane and a polymeric resin, which may be provided as a water-based dispersion of polymeric resin, the polymeric resin being present in an amount less than 10% by weight of the composition to slow the rate of corrosion of the metal surface and/or to promote adhesion of rubber thereto. The at least one silane can include a bis-amino silane, a vinyl silane, a bis-sulfur silane, or mixtures thereof and the polymeric resin may include an epoxy resin, acrylate resin, polyurethane resin, novolac resin, or mixtures thereof. The silane coating compositions may be either water or solvent based.

16 Claims, 5 Drawing Sheets

SILANE COATING COMPOSITIONS AND METHODS OF USE THEREOF

RELATED APPLICATIONS

This application claims the benefit of U.S. Provisional Application Nos. 60/715,422 and 60/715,445, both filed on Sep. 9, 2005, the disclosures of which are hereby incorporated by reference herein in their entirety.

FIELD OF THE INVENTION

The present invention pertains generally to silane coating compositions and to methods of use thereof, such as for coating metal surfaces to slow the rate of corrosion thereof and/or to promote adhesion of rubber thereto.

BACKGROUND OF THE INVENTION

Silanes have been found useful for surface treatment of metal surfaces such as to provide corrosion protection thereof and/or to promote adhesion of rubber thereto. These silanes can be divided into two groups in terms of their hydrophobicity: organic solvent-based and water-based. The former group is highly immiscible with water such that a large amount of organic solvent is required when preparing silane solutions.

Concerning water-based silanes, some of the major advantages are summarized as follows. (1) Water-based silanes are free of Volatile Organic Compounds (VOC) since only deionized water is needed for silane solution preparation. (2) There is substantial hydrolysis. Consequently, less time is required to prepare water-based silane solutions than solvent-based silane solutions. (3) Water-based silanes offer corrosion protection performance when used as a pre-treatment prior to topcoating.

Despite the advantages, one major disadvantage with current water-based silanes, for example, is that they do not provide the level of corrosion protection for metals, like the organic solvent-based silanes, when used as a surface finish. This shortcoming is believed to stem from (1) water-based silanes' intrinsic poor film coverage to metal oxides and (2) hydrophilic groups in the as-formed silane films. Accordingly, it would be desirable to provide improved silane coating compositions, which may include water-based silanes, for treatment of metal surfaces, such as to slow the rate of corrosion thereof.

In addition to using silane coating composition for corrosion prevention, adhesive bonding between metals and rubber is also of interest. By way of example, certain automobile components, e.g. tire cords and vibration dampers, rely on adhesive bonding between a metal surface and rubber. Steel tire cords, for example, are typically coated with a thin layer of brass to promote adhesion between the underlying steel and sulfur-cured rubber. In addition, adhesion promoters such as cobalt salt additives, and hexamethyl-methoxymelamine (HMMM)/resorcinol systems are used to enhance rubber adhesion to tire cords. Organic solvent-based adhesive systems also may be used in certain applications for bonding metals to sulfur-cured rubbers. Although the performance of the various methods currently employed is adequate, they still suffer from several drawbacks. Cobalt salts, for example, are expensive and pose availability problems, while brass stimulates galvanic corrosion of steel. Finally, organic solvent-based adhesives are VOC and flammable, hence, can be hazardous.

Additionally, although certain silanes, such as organic solvent-based systems, have been found to promote adhesion between a metal surface and a polymer layer, the use of organic solvents, as stated above, can be hazardous and pose concerns. The adhesive results of these silanes also are typically system dependent. In other words, the amount of adhesion provided by a particular silane coating typically depends on the metal surface as well as the polymer layer to be adhered thereto. For example, while certain silane solutions have improved adhesion between a metal surface and a peroxide-cured rubber, these same silane solutions may not necessarily provide the same results for sulfur-cured rubber. As such, it would be desirable to provide improved silane coating compositions, which include water-based silanes, for surface treatment of metal surfaces to promote adhesion of rubber, particularly sulfur-cured rubber, thereto.

Accordingly, the present invention provides for improved silane coating compositions, including water-based and organic solvent-based silane coating compositions, which include small amounts of polymeric resins, such coating compositions may be applied on metal surfaces, such as steel or aluminum alloy, for slowing their rate of corrosion and/or for bonding of rubber, e.g. sulfur-cured rubber, thereto.

SUMMARY OF THE INVENTION

The present invention is directed to silane coating compositions, including water-based and organic solvent-based compositions, and to methods of treating a metal surface therewith such as to slow the rate of corrosion thereof and/or to promote adhesion of rubber thereto. In general, the water-based silane coating compositions of the present invention include more water than organic solvent, while the solvent-based silane coating compositions of the present invention are just the opposite, i.e. include more organic solvent than water.

In one embodiment, a water or organic solvent-based silane coating composition includes at least one water-soluble or dispersible silane and a polymeric resin, the polymeric resin being present in a total concentration of no less than about 0.1% and no greater than 10% by weight of the composition.

In another embodiment, a water or organic solvent-based silane coating composition includes at least one water-soluble or dispersible silane and a water-based dispersion of polymeric resin, the water-based dispersion being present in an amount less than about 10% by weight of the coating composition. The water-based dispersion of polymeric resin may optionally include a surfactant(s). The polymeric resin of the water-based dispersion is present in a total concentration of no less than about 0.1% and no greater than 10% by weight of the composition.

Preferred silanes include bis-amino silane, vinyl silane, bis-sulfur silane, or mixtures thereof. The silanes of the coating compositions may be hydrolyzed, non-hydrolyzed, or include mixtures thereof. The polymeric resin may include an epoxy resin, acrylate resin, polyurethane resin, novolac resin, or mixtures thereof. The polymeric resin is a water-insoluble polymeric resin composition preferably dispersed in water so as to provide the water-based dispersion of polymeric resin. In addition, a corrosion inhibitor, such as sodium metavanadate or zinc phosphate, may be included in the coating compositions.

The silane coating compositions can be applied to a substrate, which includes a metal surface, such as by spraying the coating composition thereon, thereby providing a coating for slowing the rate of corrosion of the metal surface and/or for adhesion promotion of the metal surface to rubber, particularly sulfur cured rubber. The polymeric resin allows the silane to be evenly and stably dispersed in the silane coating composition, which provides for an even coating thereof on a metal surface. A topcoat, such as of a polymeric material (e.g. a paint, an adhesive, or a rubber), optionally may be provided on the silane coating composition to define a laminate structure, which includes the substrate, coating composition, and topcoat.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

The present invention is directed to water-based and organic solvent-based silane coating compositions, or resin-modified silane pretreatments. These coating compositions can be used as corrosion inhibitors of metal surfaces and/or as adhesion promoters of rubber, such as natural or synthetic rubbers, to metal surfaces.

To distinguish between water-based silane coating compositions and solvent-based silane coating compositions, the water based silane coating compositions of the present invention include more water than organic solvent while the solvent-based silane coating compositions are just the opposite, i.e. include more organic solvent than water. And, as further discussed in detail below, these silane coating compositions, both water and organic solvent based, generally include one or more water-soluble or dispersible organofunctional silanes and a water-insoluble polymeric resin, the polymeric resin being present in an amount no less than about 0.1% and no greater than 10% by weight of the composition. The polymeric resin can also be provided as a water-based dispersion of polymeric resin, the water based dispersion being present in an amount no greater than about 10% by weigh of the composition. Regardless, the total concentration of resin(s) is minimized as further discussed below.

The water-soluble or dispersible organofunctional silanes of the present invention can include aminosilanes, polysulfidesilanes, vinyl silanes, or mixtures thereof. Such silanes are disclosed in U.S. Pat. No. 6,416,869, U.S. Pat. No. 6,756,079, U.S. Pat. No. 6,919,469, PCT application No. WO 2004/009717, and U.S. Patent Publication No. 2005/0058843, the disclosures of which are hereby incorporated by reference. The silanes can be either substantially hydrolyzed or substantially non-hydrolyzed. However, the silanes of the silane coating compositions for adhesion promotion of metal to rubber typically are substantially non-hydrolyzed when added to the water-based dispersion of polymeric resin.

Preferred aminosilanes of the present invention are bis-silyl aminosilanes having two trisubstituted silyl groups wherein the substituents are individually chosen from the group consisting of alkoxy, aryloxy and acyloxy. Thus, these bis-silyl aminosilanes have the general structure:

wherein each $R^1$ is chosen from the group consisting of: $C_1$-$C_{24}$ alkyl (preferably $C_1$-$C_6$ alkyl), and $C_2$-$C_{24}$ acyl (preferably $C_2$-$C_4$ acyl). Each $R^1$ may be the same or different, however, in the hydrolyzed silane solutions, at least a portion (and preferably all or substantially all) of the $R^1$ groups are replaced by a hydrogen atom. Preferably, each $R^1$ is individually chosen from the group consisting of: ethyl, methyl, propyl, iso-propyl, butyl, iso-butyl, sec-butyl, ter-butyl and acetyl.

Each $R^2$ in the aminosilane(s) may be a substituted or unsubstituted aliphatic group, or a substituted or unsubstituted aromatic group, and each $R^2$ may be the same or different. Preferably, each $R^2$ is chosen from the group consisting of: $C_1$-$C_{10}$ alkylene, $C_1$-$C_{10}$ alkenylene, arylene, and alkylarylene. More preferably, each $R^2$ is a $C_1$-$C_{10}$ alkylene (particularly propylene).

X may be:

wherein each $R^3$ may be a hydrogen, a substituted or unsubstituted aliphatic group, or a substituted or unsubstituted aromatic group, and each $R^3$ may be the same or different. Preferably, each $R^3$ is chosen from the group consisting of hydrogen, $C_1$-$C_6$ alkyl and $C_1$-$C_6$ alkenyl. More preferably, each $R^3$ is a hydrogen atom.

Finally, $R^4$ in the aminosilane(s) may be a substituted or unsubstituted aliphatic group, or a substituted or unsubstituted aromatic group. Preferably, $R^4$ is chosen from the group consisting of: $C_1$-$C_{10}$ alkylene, $C_1$-$C_{10}$ alkenylene, arylene, and alkylarylene. More preferably, $R^4$ is a $C_1$-$C_{10}$ alkylene (particularly ethylene).

Exemplary bis-silyl aminosilanes include: bis-(trimethoxysilylpropyl)amine (which is sold under the tradename Silquest® A-1170 by GE Silicones), bis-(triethoxysilylpropyl)amine, bis-(triethoxysilylpropyl)ethylene diamine, N-[2-

(vinylbenzylamino)ethyl]-3-aminopropyltrimethoxy silane, and aminoethyl-aminopropyltrimethoxy silane.

The polysulfur silanes of the present invention preferably are bis-silyl polysulfur silanes, which may be substantially non-hydrolyzed and provided to improve adhesion to a polymer (e.g. as a paint, an adhesive, or a rubber, including sulfur-cured rubber). The bis-silyl polysulfur silanes, can include:

wherein each $R^1$ is as described before. In the hydrolyzed silane solutions of the present invention, at least a portion (and preferably all or substantially all) of the $R^1$ groups are replaced by a hydrogen atom. Z is $QS_xQ$, wherein each Q is an aliphatic (saturated or unsaturated) or aromatic group, and x is an integer of from 2 to 10. Q within the bis-functional polysulfur silane can be the same or different. In a preferred embodiment, each Q is individually chosen from the group consisting of: $C_1$-$C_6$ alkyl (linear or branched), $C_1$-$C_6$ alkenyl (linear or branched), $C_1$-$C_6$ alkyl substituted with one or more amino groups, $C_1$-$C_6$ alkenyl substituted with one or more amino groups, benzyl, and benzyl substituted with $C_1$-$C_6$ alkyl.

Particularly preferred bis-silyl polysulfur silanes include bis-(triethoxysilylpropyl) sulfides having 2 to 10 sulfur atoms. Such compounds have the following formula:

wherein x is an integer of from 2 to 10. One particularly preferred compound is bis-(triethoxysilylpropyl) tetrasulfide (also referred to as bis-(triethoxysilylpropyl) sulfane, or "TESPT"). Commercially-available forms of TESPT (such as Silquest® A-1289, available from GE Silicones), however, are actually mixtures of bis-(triethoxysilylpropyl) sulfides having 2 to 10 sulfur atoms. In other words, these commercially-available forms of TESPT have a distribution of sulfide chain lengths, with the $S_3$ and $S_4$ sulfides predominating.

The preferred vinyl silanes, which may be employed in the present invention, each have a single trisubstituted silyl group, wherein the substituents are individually chosen from the group consisting of hydroxy, alkoxy, aryloxy and acyloxy. Thus, these vinyl silanes have the general formula:

wherein each $R^1$ is chosen from the group consisting of: hydrogen, $C_1$-$C_{24}$ alkyl (preferably $C_1$-$C_6$ alkyl), and $C_1$-$C_{24}$ acyl (preferably $C_2$-$C_4$ acyl). Each $R^1$ may be the same or different, however the vinyl silane(s) is hydrolyzed in the treatment solution such that at least a portion (and preferably all or substantially all) of the non-hydrogen $R^1$ groups are replaced by a hydrogen atom. Preferably, each $R^1$ is individually chosen from the group consisting of: hydrogen, ethyl, methyl, propyl, iso-propyl, butyl, iso-butyl, sec-butyl, ter-butyl and acetyl.

$X^1$ may be a bond (specifically, a C—Si bond), a substituted or unsubstituted aliphatic group, or a substituted or unsubstituted aromatic group. Preferably, $X^1$ is chosen from the group consisting of: a bond, $C_1$-$C_6$ alkylene, $C_1$-$C_6$ alkenylene, $C_1$-$C_6$ alkylene substituted with at least one amino group, $C_1$-$C_6$ alkenylene substituted with at least one amino group, arylene, and alkylarylene. More preferably, $X^1$ is chosen from the group consisting of: a bond, and $C_1$-$C_6$ alkylene.

Each $R^2$ is individually chosen from the group consisting of: hydrogen, $C_1$-$C_6$ alkyl, $C_1$-$C_6$ alkyl substituted with at least one amino group, $C_1$-$C_6$ alkenyl, $C_1$-$C_6$ alkenyl substituted with at least one amino group, arylene, and alkylarylene. Each $R^2$ may be the same or different. Preferably, each $R^2$ is individually chosen from the group consisting of: hydrogen, ethyl, methyl, propyl, iso-propyl, butyl, iso-butyl, sec-butyl, ter-butyl and acetyl.

Particularly preferred vinyl silanes include those having the above structure, wherein each $R^2$ is a hydrogen, $X^1$ is an alkylene (especially $C_1$-$C_{10}$ alkylene), and each $R^1$ is as described above. Exemplary vinyl silanes include: vinyltrimethoxysilane, vinyltriethoxysilane, vinyltripropoxysilane, vinyltriisopropoxysilane, vinyltributoxysilane, vinyltriisobutoxysilane, vinylacetoxysilane, vinyltriisobutoxysilane, vinylbutyltrimethoxysilane, vinylmethyltrimethoxysilane, vinylethyltrimethoxysilane, vinylpropyltrimethoxysilane, vinylbutyltriethoxysilane, and vinylpropyltriethoxysilane.

As further discussed below, to prepare the water or organic solvent based silane coating compositions of the present invention, one or more of the organofunctional silanes may be provided in solution (water or organic solvent based) to give a desired percent by volume silane solution which then can be combined with a polymeric resin, which may be a water-based dispersion of a polymeric resin. The one or more of the organofunctional silanes may also be provided neat and mixed with the polymeric resin. These components, i.e. the neat silane(s) or silane solution(s) and polymeric resin, or water-based dispersion of polymeric resin, may be further prepared, for example, by being mixed, or diluted, with water or an organic solvent(s), such as alcohol, to obtain desired concentrations of the silane(s) and polymeric resin or water-based dispersion of polymeric resin as is discussed further below. Additional components may be provided in the coating compositions including, but not limited to, corrosion inhibitors.

The silane solution(s) of the present invention can range from about 70% to about 99% by weight of the coating composition, preferably, no less than about 98% by weight. The percentage of silane(s) in the silane solution preferably is from about 0.1% to about 10% by volume and, more preferably, about 5% by volume. As indicated above, the silanes may also be provided neat in the coating compositions. Regardless, the total concentration of silane(s) may range from about 0.1% to about 20% by weight of the coating composition, preferably, from about 4% to about 15%, more preferably, about 8% by weight.

In addition, when more than one silane is provided neat or in solution, different ratios of silanes may be combined, such as when preparing desired % by volume silane solutions. For example, it may be desirable to tailor the physical and/or chemical properties of the silane coating composition to a specific metallic surface. In one example, a silane solution includes about a 1:1 ratio of silane to silane. However, it should be understood that other suitable ratios may be employed, for example, 1:2 and 1:3, etc. and vice-versa, as well as, for example, 1:1:2, 1:1:3, 1:2:1, 1:3:1 when more than two silanes are used. This same concept can be applied when multiple silane solutions are prepared and combined. By way of example, two silane solutions of known concentrations may be combined in varying ratios, as explained above, to provide desired % by volume silane solutions.

Since the solubility in water of some silanes suitable for use in the present invention may be limited, the silane solution for the silane coating composition may optionally include one or more organic solvents, such as an alcohol, in order to improve silane solubility. Particularly preferred organic solvents include methanol, ethanol, propanol and isopropanol. When an organic solvent is added, the amount of solvent employed will depend upon the solubility of the particular silanes employed. Since it is often desirable to limit, or even eliminate the use of organic solvents wherever possible, the silane solution more preferably is aqueous in nature, thereby having less total organic solvent than total water.

In one specific example of a water based silane coating composition, about a 5:1 ratio by volume of aminosilane: vinyl silane, e.g. a bis-[trimethoxysilyl propyl]amine: vinyl-triacetoxysilane, may be used to provide, for example, a 5% by volume silane solution (water based) for combining with a water-based dispersion of a polymeric resin. For coating metal surfaces for bonding to sulfur cured rubber systems, as discussed in greater detail below, the silane of a water based silane coating composition may be a blend of an amino silane and a polysulfide silane. In another example, a preferred silane coating composition for sulfur cured rubber systems is a blend of a bis-silyl amino silane and a bis-silyl polysulfur silane, with the ratio of bis-silyl amino silane to bis-silyl polysulfur silane from about 1:10 to about 10:1, preferably 1:3, by weight. The polymeric resin for each example preferably is present in an amount less than 10% by weight of the composition.

The resin dispersion of the present invention is a water-insoluble polymeric resin composition preferably dispersed in water so as to provide the water-based dispersion of polymeric resin. The resin dispersion may further include a dispersing aid. The polymeric resin can include acrylate resins, novolac resins, polyurethane resins, epoxy resins, e.g. a diglycidyl ether of bisphenol A, and mixtures thereof. The dispersing aid may also include an organic solvent, such as an alcohol (e.g. methanol, ethanol, propanol, or isopropanol), or a surfactant (e.g. a nonioninc surfactant, such as Surfynol 104H available from Air Products).

It is generally desirable to minimize the amount of resin, typically using only enough for the silane to be dispersed in the coating composition. As a water based dispersion of polymeric resin, the resin may range from about 35% to about 65% by weight of the water-based dispersion, preferably, about 40% to about 50%, more preferably, about 42% to about 55% by weight of the water-based dispersion. The water-based dispersion of polymeric resin may vary but generally is present in an amount less than about 10% by weight of the composition. The total concentration of resin(s), whether present in a water based dispersion or neat, ranges from no less than about 0.1% to no greater than 10% by weight of the coating composition, preferably, no less than about 0.1% to no greater than about 7%, more preferably, about 1.0% by weight.

Suitable water based dispersions of polymeric resin, or resin dispersions, of the present invention may be purchased commercially and can include, for example, EPI-REZ® 5522-WY-55, which includes a diglycidyl ether of bisphenol A (DGEBA) epoxy 55% water dispersion, EPI-REZ® 3510-WY-60, which is a 60% epoxy water dispersion, EPI-REZ® WD 510, which is a water reducible diglycidyl ether of bisphenol A (DGEBA) epoxy (100% resin), or ECO-CRYL® 9790, an aqueous acrylic resin water dispersion with 42% resin dispersed in 7% 2-propoxyethanol, 3% xylene, and 3% ethanolamine, and 45% water, all of which are available from Hexion Specialty Chemicals, Inc. of Columbus, Ohio. The polymeric resin allows the silane(s) to be evenly and stably dispersed in the silane coating composition, which provides for an even coating thereof on a metal surface.

The total water content of the water-based silane coating compositions of the present invention preferably is at least about 70% by weight of the composition up to about 98% and, more preferably, about 95% by weight of the composition. In preferred embodiments, the water-based silane coating compositions are devoid of organic solvents or at least substantially devoid of organic solvents insofar as the solvents are present in an amount no greater than about 10% by weight of the coating composition.

The total organic solvent content of the solvent-based silane coating compositions of the present invention is at least about 70% by weight of the composition up to about 90% and, more preferably, about 75% by volume of the composition. The organic solvents can include alcohol, such as methanol, ethanol, propanol, or isopropanol. In preferred embodiments, the solvent-based silane coating compositions are devoid of water or at least substantially devoid of water insofar as water is present in an amount no greater than about 10% by weight of the coating composition.

In addition, the silanes, particularly the polysulfur silane(s), may be prepared as an emulsion. With emulsions, the silane(s) is mixed with water and a suitable surfactant, such as are known to those skilled in the art. In one example, an emulsified solution of a bis-silyl polysulfur silane can be prepared, for example, by mixing a 5% solution of the silane in water along with 0.2% of a surfactant (by volume). Suitable surfactants can include, for example, sorbitan fatty acid esters (such as Span 20, available from ICI Surfactants). Once the emulsion of polysulfur silane has been prepared, it may be mixed with one or more bis-silyl aminosilanes and the desired water-dispersible resin, the resin being present in an amount less than 10% by weight of the composition, and then applied to the desired metal surface.

Other optional ingredients in the silane coating compositions include corrosion inhibitors, nanoparticles (e.g. benzotriazole), and/or colorants. The corrosion inhibitor may be either organic or inorganic. Organic corrosion inhibitors include an azole, more advantageously, triazole or a derivative thereof, and most advantageously tolytriazole, benzotriazole, and 1,2,4-triazole. Preferably, the inorganic particle will be a rare earth metal, i.e. a lanthanide or actinide, Group V (or Vb) element, or salt thereof. A preferred rare earth metal is cerium or a salt thereof, and most preferably, cerium acetate while the Group V element is preferably vanadium or a salt thereof, most preferably, sodium metavanadate. Another preferred inorganic corrosion inhibitor is zinc phosphate. The coating composition should include no greater than about 1000 ppm of corrosion inhibitor, preferably, from about 50 ppm to about 700 ppm of corrosion inhibitor and, more preferably, about 500 ppm.

The silane coating compositions may be applied to a metal surface of a substrate, including, but not limited to, roofing, railing, metal tire cords, etc., by any means known in the art including, but not limited to, spraying, brushing, wiping, or rolling of the composition onto the metal substrate and/or by dipping the substrate into the coating composition. The coating composition may be air dried or dried at a desired temperature to promote quicker drying. One or more coatings may be applied for a total thickness of about 50 to about 1500 nm. An individual coating may be applied at a thickness of from about 50 nm to about 500 nm. The metal surface of the substrate can include, for example, steel, such as hot dip galvanized steel, aluminum, nickel, titanium, zinc, copper, alloys thereof (e.g. brass, bronze, and zinc metal alloys, such as zinc tin alloys), and the like.

The silane coating compositions are particularly useful to improve adhesion of rubber compounds to metals coated with the compositions such as brass-plated steel tire cords. If the sulfur is vulcanizable, a sulfur containing silane is used. Other silanes, such as vinyl silanes, are useful adhesion promoters for other rubber compounds, e.g., peroxide-cured and guanidine-cured. Additionally, the steel tire cord does not have to be brass-plated. Rather, for example, bare steel, zinc-plated or bronze-coated steel, such as used in the bead region of tires, may also be considered and treated with the silane coating compositions.

A topcoat, including paint or other polymeric coatings (e.g. adhesives or rubber coatings), may be applied directly on top of the silane coating compositions provided by the present invention to define a laminate structure, which includes the substrate, coating composition, and topcoat. The silane coating compositions of the present invention are understood to provide excellent corrosion protection without a topcoat, such as paint, and/or also may provide superior adhesion of paint, rubber or other polymer layers. Thus, unlike many of the currently-employed treatment techniques, the silane coating compositions of the present invention need not be removed prior to painting (or applying other types of polymer coatings such as rubber).

Non-limiting examples of water and organic solvent-based silane coating compositions, in accordance with the present invention, and methods of making and using same, such as for coating metal surfaces to slow the rate of corrosion thereof, are provided below.

Example I

In this example, a 5% by volume AV5 silane solution was made by mixing 5 parts of neat bis-(trimethoxysilyl-propyl) amine (Silquest® A-1170, available from GE Silicones, www.gesilicones.com) with 1 part of neat vinyltriacetoxysilane (SIV 9098, available from Gelest Inc., www.gelest.com). Five parts of this mixture were added to 95 parts deionized (DI) water and mixed well. The silane solution was aged for 3 weeks before using. The water based dispersion of polymeric resin was made by mixing 70 weight parts of EPI-REZ® 5522-WY-55 (a diglycidyl ether of bisphenol A (DGEBA) epoxy 55% water dispersion, available from Hexion Specialty Chemicals, Inc. of Columbus, Ohio) with 15 parts of polyisocyanate (a curing agent) and 0.5 weight part of tin catalyst. The mixture was then diluted with n-butoxy ethanol to 50% by volume. Then, 98 weight parts of the silane solution and 2 weight parts of the water-based dispersion of resin were combined to provide a water-based silane coating composition.

Hot-dip galvanized steel (HDG) panels were cleaned with a 7% Chemclean (purchased from Chemetall/Oakite Inc) at 60° C., followed by tap water rinsing and blow air-drying. The cleaned HDG panels were immersed into the above silane coating composition followed by 100° C. curing for 1 hour.

Electrochemical impedance spectroscopy (EIS) was conducted on the above coated panels in neutral 3.5% NaCl solution. The control system included HDG treated with only the 5% AV5 silane solution disclosed above, i.e. the water-based silane coating composition without the resin component.

Figure 1:
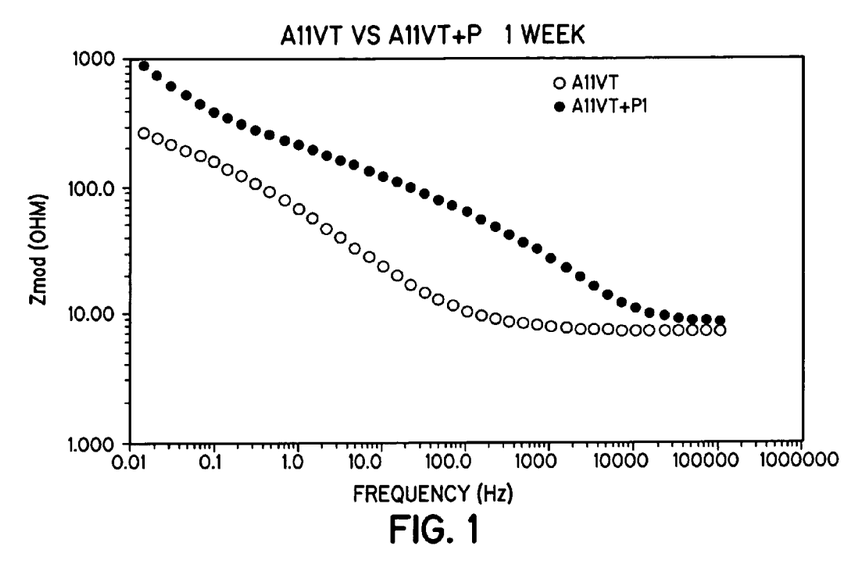
FIG. 1 shows Electrochemical Impedance Spectroscopy (EIS) curves for silane coating compositions (A11VT+P and A11VT) of the present invention on hot-dip galvanized steel (HDG) after 1 week of salt immersion.

With reference to FIG. 1, panels coated with the control system were labeled A11VT while panels coated with the silane coating composition were labeled A11VT+P. FIG. 1 compares the corresponding EIS curves for both A11VT+P and A11VT systems on HDG after 1 week of salt immersion, during which the low-frequency impedance of A11VT+P is still higher than A11VT.

From the above testing results, the panels with the silane coating composition (A11VT+P) perform much better than the control system without resin (A11VT). In other words, the corrosion protection of the silane coating is enhanced by the addition of small amounts of resin.

Example II

In this example, a 5% by volume A-1289 silane solution was made by dispersing 5 ml bis-(triethoxysilylpropyl-)tetrasulfide (Silquest® A-1289, available from GE Silicones, www.gesilicones.com) in 95 ml DI water. 4 g EPI-REZ® WD 510 (a water-reducible diglycidyl ether of bisphenol A (DGEBA) epoxy resin (100% resin), available from Hexion Specialty Chemicals, Inc. of Columbus, Ohio) was added into 100 ml of the 5% A-1289 aqueous mixture to provide a water-based silane coating composition. The individual components were stir-mixed for 24 hrs before combining.

Example III

In yet a third example, a 5% by volume A-1289 silane solution was made by dispersing 5 ml bis-(triethoxysilylpropyl)tetrasulfide (Silquest® A-1289, available from GE Silicones, www.gesilicones.com) in 95 ml DI water. 4 g of ECO-CRYL® 9790, an aqueous acrylic with 42% solid dispersed in 7% 2-propoxyethanol, 3% xylene, and 3% ethanolamine, and 45% water, was added into 100 ml of the 5% A-1289 aqueous mixture to provide a water-based silane coating composition. The individual components were stir-mixed for 24 hrs before combining.

Aluminum alloy (AA 6111) and HDG panels were cleaned with a 7% Chemclean (purchased from Chemetall/Oakite Inc) at 60° C., followed by tap water rinsing and blow air-drying. The cleaned AA 6111 and HDG panels were immersed into the above two silane coating compositions (Examples II and III), followed by 150° C. curing for 1 hour.

DC polarization test and EIS measurement were conducted on the above panels in neutral 3.5% NaCl solution. The control system is untreated AA 6111 and HDG.

Figure 2:
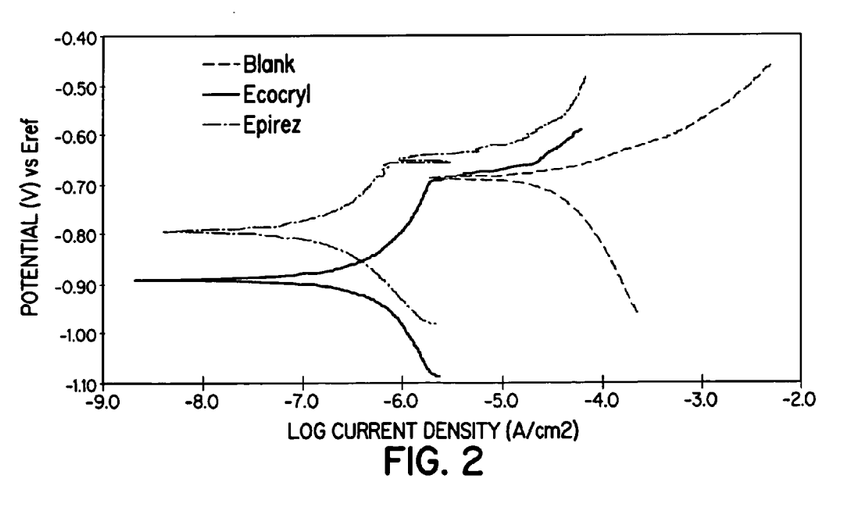
FIG. 2 shows direct current (DC) curves for aluminum alloy (AA 6111) with and without treatments of silane coating compositions of the present invention.
Figure 3:
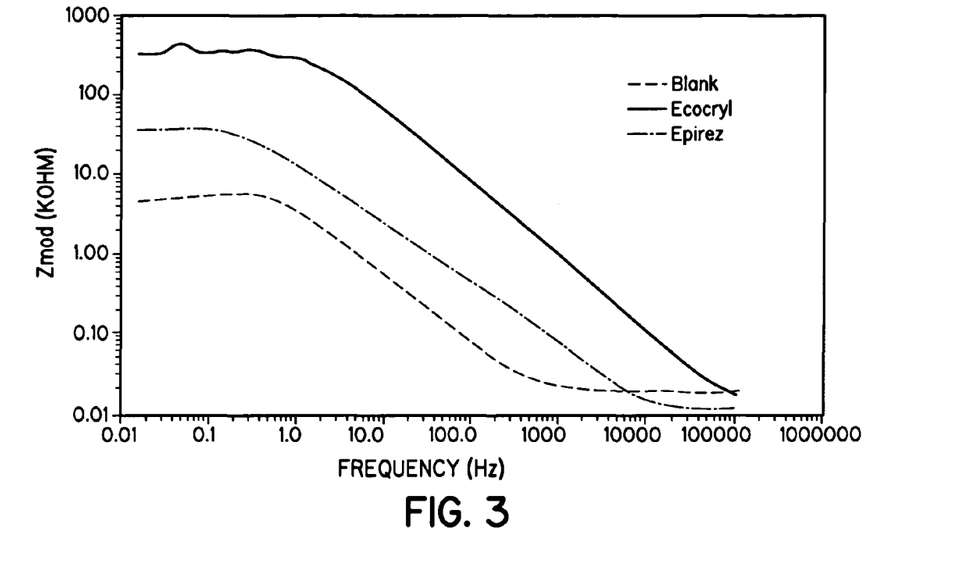
FIG. 3 shows EIS curves for AA 6111, with and without treatments of silane coating compositions of the present invention, after 18 hours of salt immersion.
Figure 4:
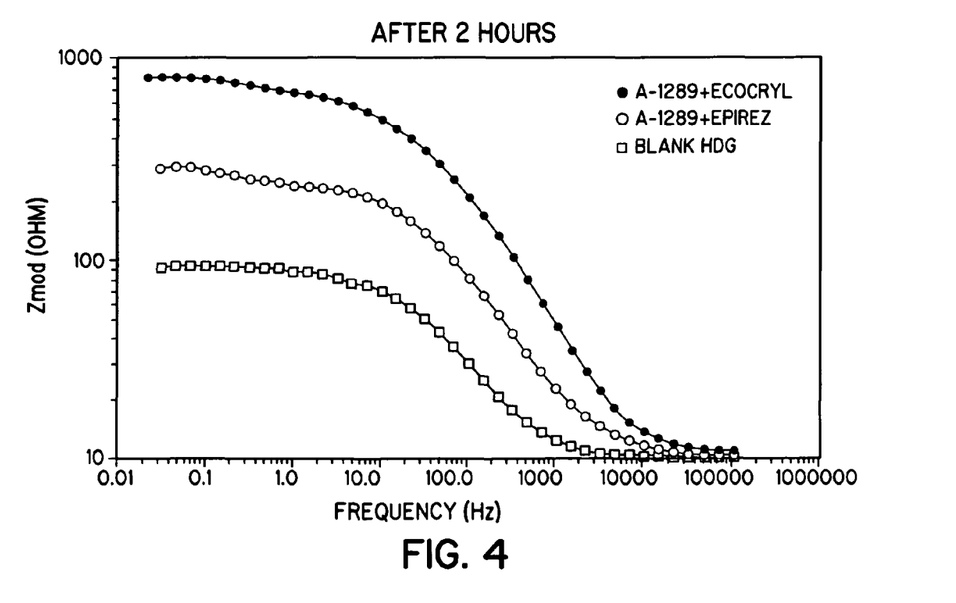
FIGS. 4 and 5 show EIS curves for HDG treated with and without silane coating compositions of the present invention, respectively, after 2 hrs and 24 hrs of salt immersion.
Figure 5:
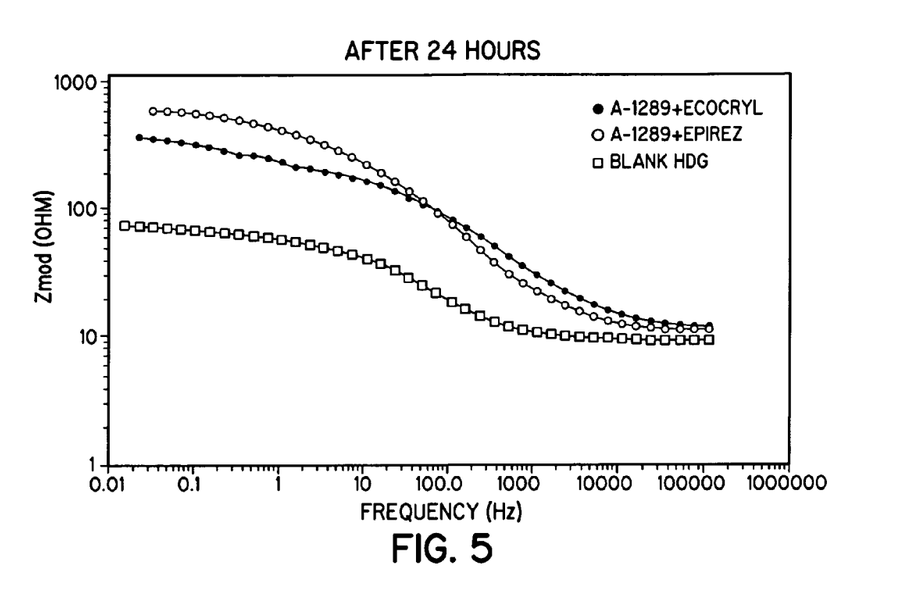

FIG. 2 compares the representative DC curves for AA 6111 with and without silane coating treatments. FIG. 3 compares the corresponding EIS curves for AA 6111 with and without treatments after 18 hours of salt immersion. FIGS. 4 and 5 compare the EIS curves for HDG treated with and without silane coating compositions, respectively, after 2 hrs and 24 hrs of salt immersion.

From the above results, the silane coating compositions (Examples II and III) of the present invention appear to reduce corrosion rate by at least two decades. This is in good agreement with the EIS results, which consistently shows higher low-frequence impedances for the ECO-CRYL® and EPI-REZ® silane coatings in comparison with untreated metals. This indicates that the addition of resin enhances the corrosion protection performance of silane films on both aluminum alloys and HDG.

Additional water-based silane coating compositions of the present invention are disclosed below in Table 1.

TABLE 1

Corrosion inhibitor-incorporated silane coating compositions

| Formulation | Concentration of 5% AV5 (% weight) | Concentration of water-based dispersion of resin (% weight) | Corrosion Inhibitor (ppm) |
|---|---|---|---|
| L00 (control) | 100 | 0 | 0 |
| L11 | 99 | 1 | 100 |
| L12 | 99 | 1 | 150 |
| L13 | 99 | 1 | 200 |
| L21 | 98 | 2 | 100 |
| L22 | 98 | 2 | 150 |
| L23 | 98 | 2 | 200 |
| L31 | 97 | 3 | 100 |
| L32 | 97 | 3 | 150 |
| L33 | 97 | 3 | 200 |

In Table 1, the resin was EPI-REZ® 5522-WY-55 (diglycidyl ether of bisphenol A (DGEBA) epoxy 55% water dispersion), available from Hexion Specialty Chemicals, Inc. of Columbus, Ohio. The corrosion inhibitor was sodium metavanadate (available from Fluka Industries). The 5% by volume AV5 silane mixture was made by mixing 5 parts of neat bis-(trimethoxysilylpropyl)amine (Silquest® A-1170, available from GE Silicones, www.gesilicones.com) with 1 part of neat vinyltriacetoxysilane (SIV 9098, available from Gelest Inc., www.gelest.com). Five parts of this mixture were added into 95 parts DI water and mixed well. Each formulation, i.e. each silane coating composition (L00-L33), included the indicated concentration of 5% by volume AV5 silane mixture and resin, as well as the ppm of corrosion inhibitor.

Aluminum alloy (AA 2024-T3) panels were cleaned with a 7% Chemclean (purchased from Chemetall/Oakite Inc) at 70° C., followed by tap water rinsing and blow air-drying. The cleaned AA 2024-T3 panels were immersed into the above silane coating compositions of Table 1 for one minute, followed by 150° C. curing for one hour.

DC polarization tests and EIS measurements were conducted on the above panels in neutral 3.5% NaCl solution. Salt-water immersion and scratch cell tests were also conducted. The control system ("L00") is AA 2024-T3 treated with only the 5% AV5 mixture, i.e. without water based resin dispersion or corrosion inhibitor.

Figure 6:
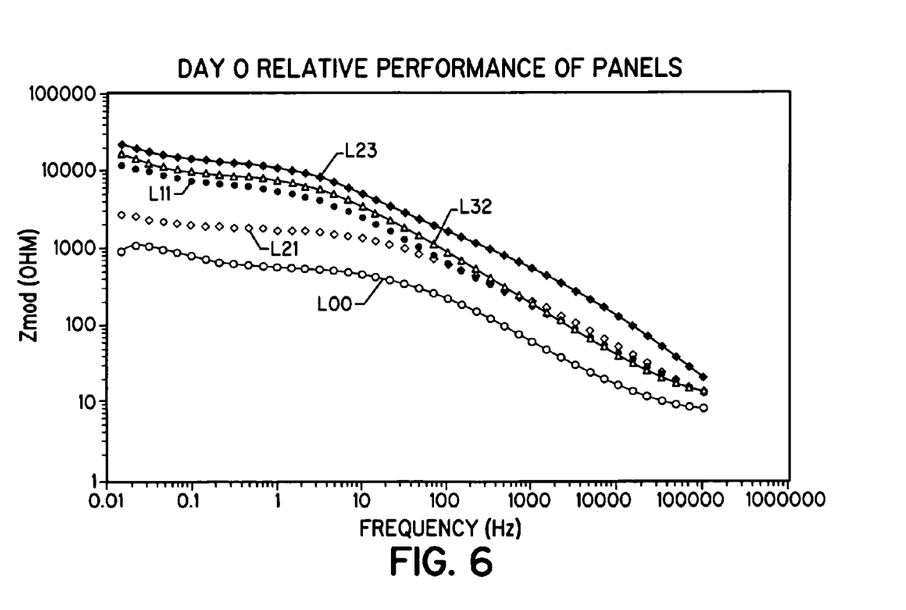
FIGS. 6 and 7 show EIS curves for AA 2024-T3 having silane coatings of the present invention, respectively, before immersion (after 0 days of immersion) and after 25 days of immersion in 3.5% neutral sodium chloride (NaCl) solution.
Figure 7:
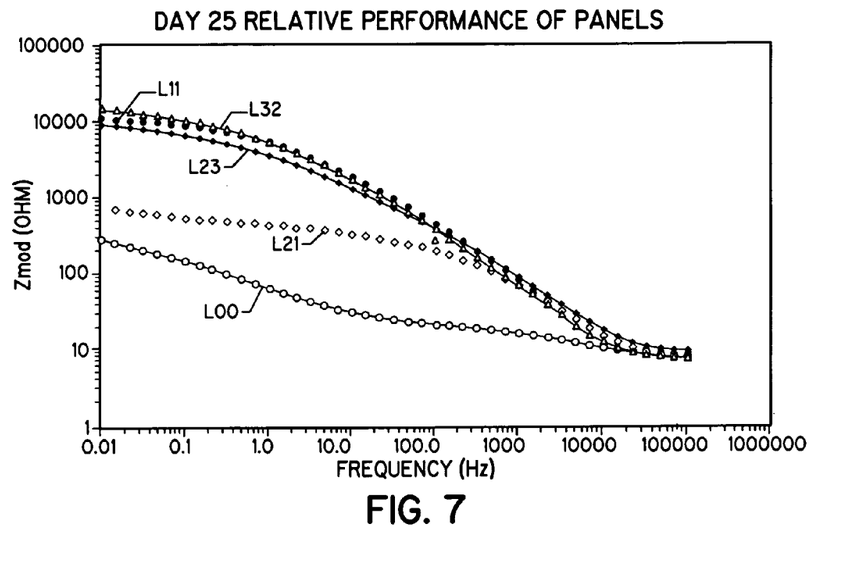
Figure 8:
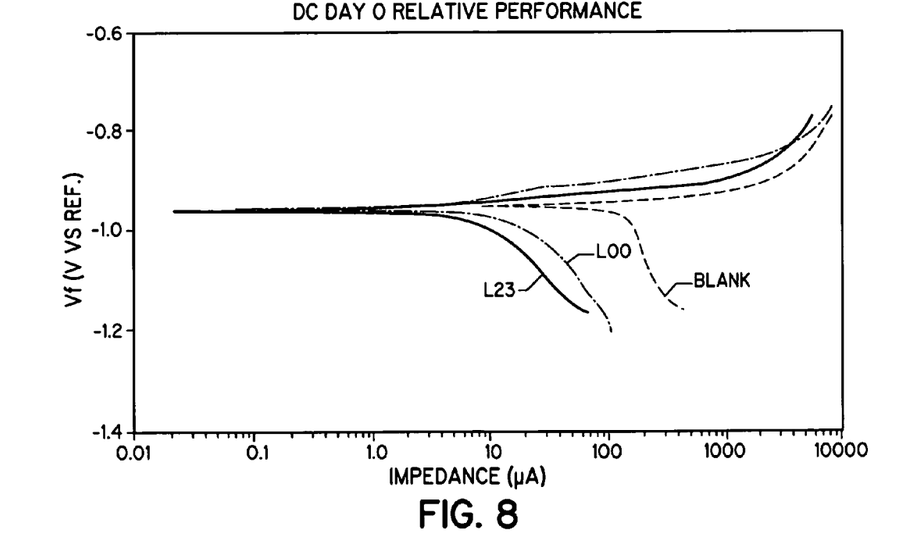
FIGS. 8 and 9 show DC curves for silane coating compositions of the present invention on AA 2024-T3 before immersion (after 0 days of immersion) and after 14 days of immersion in 3.5% neutral sodium chloride (NaCl) solution.
Figure 9:
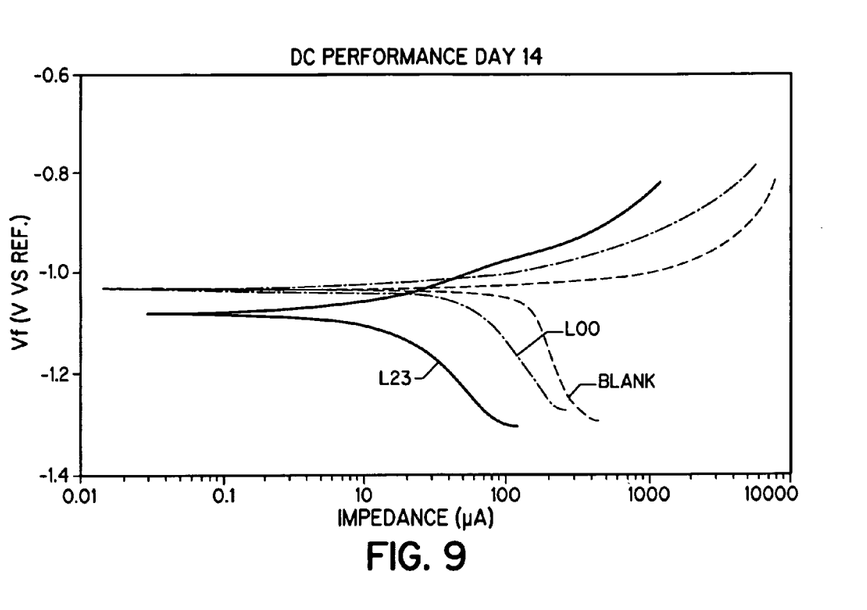

FIGS. 6 and 7 compare the EIS curves for various silane coating compositions (L00, L11, L21, L23, and L32) on AA 2024-T3 after 0 and 25 days of immersion in 3.5% neutral NaCl solution. FIGS. 8 and 9 compare the DC curves for various silane coating compositions (L00, L23, and a blank) on AA 2024-T3 after 0 and 14 days of immersion in 3.5% neutral NaCl solution.

The testing results indicate that water-based silane coating compositions of the present invention generally improved the corrosion protection of the metals as compared to the silane film only. Additionally, with small amounts of corrosion inhibitor, i.e. sodium metavanadate, the corrosion prevention is even stronger than the resin-modified silane coatings only. It has been observed that the L23 formulation, i.e. 2% wt water based resin dispersion in 98% wt 5% AV5 mixture and 200 ppm sodium metavanadate, seemed to be the most effective coating composition.

Example IV

In another example, an AV5 silane mixture was made by mixing 5 parts of neat bis-(trimethoxysilylpropyl)amine (Silquest® A-1170, available from GE Silicones, www.gesilicones.com) with 1 part of neat vinyltriacetoxysilane (SIV 9098, available from Gelest Inc., www.gelest.com). EPI-REZ® WD 510 (a water-reducible diglycidyl ether of bisphenol A (DGEBA) epoxy resin (100% resin), available from Hexion Specialty Chemicals, Inc. of Columbus, Ohio) was mixed with the AV5 silane mixture at a 1:4 ratio by weight. 2 volume parts of the silane/resin mixture was then added into 2.0 parts deionized (DI) water and 96 parts denatured alcohol to provide an organic solvent-based silane coating composition in accordance with one embodiment of the present invention.

Aluminum alloy (AA 2024-T3) panels were cleaned with a 7% Chemclean (purchased from Chemetall/Oakite Inc) at 70° C., followed by tap water rinsing and blow air drying. The cleaned AA 2024-T3 panels were immersed into the above resin-modified silane solution for 30 seconds, followed by ambient curing for 1 day. A solvent-based polyurethane-based primer and a topcoat then were coated onto the silane-treated AA 2024-T3 panels, followed by ambient curing. The primer and topcoat films were, respectively, about 25 μm thick and about 50 μm thick.

ASTM B117 salt spray tests were conducted on the coated panels. The control system was a chromate pretreated AA 2024-T3 panel.

After 2000 hours, the testing results showed no corrosion activity on either intact or scribed areas of the AA 2024-T3 panels treated with the silane coating composition.

Non-limiting examples of water based silane coating compositions, in accordance with the present invention, and methods of making and using the same for bonding metal to rubber, are provided below.

Table 2 below shows the formulation of twelve different water-based silane coating compositions, which include silanes 1 and 2, a water dispersion of polymeric resin, i.e. resin, and optional components including another silane, i.e. A1289 (bis-[triethoxysilylpropyl] tetrasulfide), a corrosion inhibitor (benzotriazole (BTA)), nanoparticles of silica, and/or zinc oxide.

TABLE 2

| No. | Silane 1 | Silane 2 | A1289 | Silica | BTA | ZnO | Ratio of silanes 1 & 2 | Resin |
|---|---|---|---|---|---|---|---|---|
| 1. | A1589 | Y9400 | 0 | 0.4% | 0 | 0 | 3:1 | None |
| 2. | A1589 | Y9400 | 1% | 0.4% | 0 | 0 | 3:1 | None |
| 3. | A1589 | Y9400 | 0.5% | 0.4% | 0 | 0 | 3:1 | None |
| 4. | A1589 | Y9400 | 0 | 0.4% | 0 | 0.2% | 3:1 | None |
| 5. | A1589 | Y9400 | 0 | 0.4% | 500 ppm | 0 | 3:1 | None |
| 6. | A1589 | Y9400 | 0 | 0.4% | 0 | 0 | 1:1 | None |
| 7. | A1589 | Y9400 | 1% | 0.4% | 0 | 0 | 1:1 | None |
| 8 | A1589 | Y9400 | 0.5% | 0.4% | 0 | 0 | 1:1 | None |
| 9. | A1589 | Y9400 | 0 | 0.2% | 0 | 0.2% | 1:1 | None |
| 10. | A1289 | A1170 | NA | 0 | 0 | 0 | 3:1 | EPI-REZ ® 3510-WY-60 |
| 11. | A1289 | A1170 | NA | 0 | 0 | 0 | 3:1 | ECO-CRYL ® 9790 + EPI-REZ ® 3510-WY-60 |
| 12. | A1289 | A1170 | NA | 0.4% | 0 | 0 | 3:1 | EPI-REZ ® 3510-WY-60 |

In Table 2 above, A1589 is bis-[triethoxysilylpropropyl] disulfide; A1170 is bis-[triethoxysilylpropropyl] amine; and Y9400 is bis-[triethoxysilylpropropyl] diamine. As already stated above, A1289 is bis-[triethoxysilylpropropyl] tetrasulfide. Each of the identified silanes 1 and 2 were mixed in the ratio by volume as specified in Table 2. The final silane coating compositions included 5% by weight of the silane mixture and, where applicable, further included 4% by weight of the water-based dispersion of the identified (polymeric) resin. The additional optional components were present in the silane coating composition in the % by weight or ppm as indicated. The remainder of the silane coating compositions included water, thereby providing water-based silane coating compositions.

Table 3 below shows the adhesion results of pull out tests for the twelve water based silane coating compositions of Table 2 in the form of pull-out forces (lbf). For the pull-out tests, 1.35 mm sized brass coated steel wires were acid cleaned using Chemacie™, which is available from Chemetall-Oakite, for 3 minutes at 50° C. The wires were air-dried for 10 min. and then immersed in the silane coating compositions for 5 s. The wires then were air-dried and embedded in sulfur-cured rubber, which was vulcanized under standard conditions (10 minutes at 175° C. in a mold under pressure). The coated wires then were dispatched for adhesion testing according to the ASTM D-2229 test. Accordingly, each wire was pulled out on a tensile tester with the observed pull-out forces given in Table 3. The controls in this test were untreated brass coated wires.

TABLE 3

Pull-out forces (lbf) for the 12 compositions of Table 2.

| wire # | 1 | 2 | 3 | 4 | 5 | 6 | 7 | 8 | 9 | 10 | 11 | 12 | Control 1 | Control 2 | Control 3 | | |
|---|---|---|---|---|---|---|---|---|---|---|---|---|---|---|---|---|---|
| 1 | 53.7 | 70.2 | 46.5 | 23.2 | 71.7 | 86 | 41.9 | 21.6 | 24 | 90.5 | 31.8 | 86.6 | 73.6 | 77.9 | 59 | Avg | 57.1 |
| 2 | 79.8 | 81 | 80.5 | 26.3 | 65.5 | 87.5 | 103.1 | 25.1 | 25.2 | 90.1 | 89.3 | 74.7 | 79.8 | 80.9 | 82.6 | Avg | 71.4 |
| 3 | 70.1 | 95.8 | 56.5 | 22.4 | 51 | 65.6 | 54.9 | 20.6 | 23.2 | 80 | 39 | 77.6 | | 91.4 | 74.1 | Avg | 58.7 |
| Avg | 67.9 | 82.3 | 61.2 | 24.0 | 62.7 | 79.7 | 66.6 | 22.4 | 24.1 | 86.9 | 53.4 | 79.6 | 76.7 | 83.4 | 71.6 | | |

Overall control avg: 77.3

Although the pull-out values varied considerably for each of the water based silane coating compositions and for the control, the following trends can be observed: 1. Zinc oxide appears to have a negative effect on the pull-out force. 2. BTA appears to have a positive effect. 3. The addition of the extra silane A-1289 appears to have a positive effect. 4. The best silane coating compositions appear to be those that contain a water dispersion of epoxy resin while the addition of an acrylate, i.e. ECO-CRYL®, resin dispersion appears to have a negative effect. Based on the pull-out values, silane coating compositions 2, 6, 10 and 12 were selected for further optimization for silica loading, BTA loading, and silane concentration (See Table 4 below).

tration, and silane concentration (See Table 5 below). The resin used was EPI-REZ® 3510-WY-60.

TABLE 5

| Mixture | DI water (mL) | EPI-REZ® 3510-WY-60 (g) | A-1170 (mL) | A-1289 (mL) | Vol % Si (%) |
|---------|---------------|-------------------------|-------------|-------------|--------------|
| A | 97 | 2 | 0.25 | 0.75 | 1 |
| B | 95 | 4 | 0.25 | 0.75 | 1 |
| C | 93 | 6 | 0.25 | 0.75 | 1 |
| D | 95.5 | 2 | 0.625 | 1.875 | 2.5 |

TABLE 4

Optimized silane coating compositions nos. 2, 6, 10 and 12 from Table 2 including different silane mixtures, ratios, concentrations and additives.

| | Si (g/100 ml) | | | | | | | | |
|---|---|---|---|---|---|---|---|---|---|
| | 0.2 | | | 0.4 | | | 0.6 | | |
| BTA(ppm) | 250 | 500 | 570 | 250 | 500 | 750 | 250 | 500 | 750 |
| A-1289 [H] (%) | Base Chemistry (1): A-1589/Y9400 (3:1) | | | | | | | | |
| 1.0 | 1 | | | 4 | | | | | 7 |
| 1.5 | | 2 | | | 5 | 8 | | | |
| 2.0 | | 3 | 6 | | | | | 9 | |
| A-1289 [H] (%) | Base Chemistry (2): A-1589/Y9400 (1:1) | | | | | | | | |
| 1.0 | 10 | | | 13 | | | | | 16 |
| 1.5 | | 11 | | | 14 | 17 | | | |
| 2.0 | | 12 | 15 | | | | | 18 | |
| A-1289 [H] (%) | Base Chemistry (3): A-1589/Y9400 (3:1) + EPI-REZ® | | | | | | | | |
| 1.0 | 19 | | | 22 | | | | | 25 |
| 1.5 | | 20 | | | 23 | 26 | | | |
| 2.0 | | 21 | 24 | | | | | 27 | |

| | Base Chemistry (4): A-1289/A1170 (3:1) + EPI-REZ® Si (g/100 ml) | | |
|---|---|---|---|
| BTA (ppm) | 0.2 | 0.4 | 0.6 |
| 250 | 28 | 31 | 34 |
| 500 | 29 | 32 | 35 |
| 750 | 30 | 33 | 36 |

| BTA (ppm) | Base Chemistry (5): A-1289/A1170 [NEAT] (3:1) + EPI-REZ® |
|---|---|
| 250 | 37 |
| 500 | 38 |
| 750 | 39 |

| | Base Chemistry (6): A1589/Y9400 [NEAT] (3:1) + EPI-REZ® A-1289[NEAT] | | |
|---|---|---|---|
| BTA (ppm) | 1.0 | 1.5 | 2.0 |
| 250 | 40 | 43 | 46 |
| 500 | 41 | 44 | 47 |
| 750 | 42 | 45 | 48 |

Pull-out tests were again conducted according to the ASTM D-2229 test as described above. The results from these tests led to optimized silane coating composition H of Table 5 which included 4 g water based dispersion of polymeric resin, 5 ml silane mixture (3:1 ratio by volume, A1289:A1170) and 91 ml water. This composition was still further optimized for silica loading level, water-based dispersion of resin concen-

TABLE 5-continued

| Mixture | DI water (mL) | EPI-REZ® 3510-WY-60 (g) | A-1170 (mL) | A-1289 (mL) | Vol % Si (%) |
|---------|---------------|-------------------------|-------------|-------------|--------------|
| E | 93.5 | 4 | 0.625 | 1.875 | 2.5 |
| F | 91.5 | 6 | 0.625 | 1.875 | 2.5 |

TABLE 5-continued

| Mixture | DI water (mL) | EPI-REZ® 3510-WY-60 (g) | A-1170 (mL) | A-1289 (mL) | Vol % Si (%) |
|---|---|---|---|---|---|
| G | 93 | 2 | 1.25 | 3.75 | 5 |
| H | 91 | 4 | 1.25 | 3.75 | 5 |
| I | 89 | 6 | 1.25 | 3.75 | 5 |

Pull-out tests were again conducted according to the ASTM D-2229 test as described above. Silane coating compositions A-C, which are 1% silane by volume, produced the best pull out results of coatings A-I. Based on this data, another series of coating compositions, J-O, as shown in Table 6 below, were prepared in which the amount of water-based dispersion of resin in the compositions was varied. The resin used was EPI-REZ® 3510-WY-60.

TABLE 6

| Mixture | DI water (mL) | EPI-REZ® 3510-WY-60 (g) | A-1170 (mL) | A-1289 (mL) | Vol % Si (%) |
|---|---|---|---|---|---|
| J | 99 | 0.5 | 0.125 | 0.375 | 0.5 |
| K | 98.5 | 1 | 0.125 | 0.375 | 0.5 |
| L | 97.5 | 2 | 0.125 | 0.375 | 0.5 |
| M | 98.5 | 0.5 | 0.25 | 0.75 | 1 |
| N | 98 | 1 | 0.25 | 0.75 | 1 |
| O | 97 | 2 | 0.25 | 0.75 | 1 |

Pull-out tests were again conducted according to the ASTM D-2229 test. Silane coating compositions, M-O, all exceeded control pull out values. The controls again were untreated brass coated wires. Based on these results, N and O were selected for further testing on tire cords.

Pull-out tests were conducted according to the ASTM D-2229 test. For these pull-out tests, 1.35 mm sized brass coated tire cords were acid cleaned using Chemacie™, which is available from Chemetall-Oakite, for 3 minutes at 50° C. The tire cords were air-dried for 10 min. and then immersed in the silane coating compositions for 5 s. The tire cords then were air-dried and embedded in sulfur-cured rubber, which was vulcanized under standard conditions (10 min at 175° C. in a mold under pressure). The coated tire cords then were dispatched for adhesion testing. The controls in this test were untreated brass coated tire cords.

The pull out values for silane coating compositions N and O did not meet controls, therefore, the cleaning system was further optimized. In a first example, the tire cords were acid cleaned with 12% HCl then 0.5M NaOH, dried, and coated with the silane coating compositions N and O. The tire cords then were air-dried and embedded in sulfur-cured rubber, which was vulcanized under standard conditions (10 min at 175° C. in a mold under pressure). The coated tire cords then were dispatched for adhesion testing. After pull out tests were conducted, the results indicated that N and O still did not meet the control.

In a second example, the acid step was eliminated with only 0.5M NaOH being used for cleaning the brass coated tire cords. Further pull out testing was performed but N and O still did not meet the control. Finally, the tire cords were cleaned with 1.0M NaOH, dried, then cleaned again with 1.0M NaOH and dried prior to applying the silane coating compositions. The pull out values for the silane coating composition of N, which included 1 wt % of silanes (3:1 ratio by volume, A1289:A1170), 1 g water based dispersion of polymeric resin and 98 wt % water, exceeded that of the control.

The tire cord testing results indicate that too much of the water based dispersion of resin in solution may cause the silane mixture to be non-homogenous, preventing good coating of the tire cord insofar as it appears that the silane settles out of solution. In addition, the caustic cleaning of the tire cords appears to have had the most direct impact on the silane coating composition.

Accordingly, there are provided improved silane coating compositions, and methods of making the same, that are applied to metal surfaces of substrates for slowing the rate of corrosion thereof and/or improving adhesion of rubber to metal. The silane coating compositions may be organic solvent based, or may be water based for reducing the VOC content of corrosion reducing coatings, such coatings having been enhanced by the addition of small amounts of a water-based dispersion of polymeric resin.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicant's general inventive concept.

What is claimed is:

1. A composition suitable for coating a metal surface, comprising:
   at least one water-soluble or dispersible organofunctional bis-amino silane; and
   a water-based dispersion of a polymeric resin, the polymeric resin including at least an epoxy resin and being present in an amount no less than about 0.1% and no greater than 1% by weight of the composition.

2. The composition of claim 1, wherein the at least one silane is substantially hydrolyzed.

3. The composition of claim 1, wherein the at least one silane is substantially non-hydrolyzed.

4. The composition of claim 1, further including a corrosion inhibitor.

5. The composition of claim 1, wherein the silane coating composition further includes a total water content of about 70% to about 99% by weight of the composition.

6. The composition of claim 1, wherein the silane coating composition further includes a total organic solvent content of about 70% to about 90% by weight of the composition.

7. The composition of claim 1, wherein the total silane concentration is about 0.1% to about 20% by weight of the coating composition.

8. The composition of claim 1, further including a water-soluble or dispersible vinyl acetoxy silane.

9. The composition of claim 8, wherein the bis-amino silane is bis-[trimethoxysilylpropyl]amine and the vinyl acetoxy silane is vinyltriacetoxysilane.

10. The composition of claim 9, further including a corrosion inhibitor.

11. The composition of claim 10, further including no greater than about 1000 ppm of the corrosion inhibitor.

12. The composition of claim 9, further including about a 5:1 ratio by volume of bis-[trimethoxysilylpropyl]amine: vinyltriacetoxysilane.

13. The composition of claim 1, further including a water-soluble or dispersible bis-sulfur silane.

14. The composition of claim 13, wherein the water-soluble or dispersible bis-amino silane is bis[triethoxysilylpropyl] amine and the water-soluble or dispersible bis-sulfur silane is bis[triethoxysilylpropyl] tetrasulfide.

15. The composition of claim 14, further including a corrosion inhibitor.

16. The composition of claim 14, further including about a 3:1 ratio by volume of bis[triethoxysilylpropyl] amine: bis[triethoxysilylpropyl] tetrasulfide.

* * * * *